United States Patent
Zafirovic-Vukotic et al.

(10) Patent No.: US 11,979,024 B2
(45) Date of Patent: May 7, 2024

(54) POWER DISTRIBUTION VIRTUAL NETWORKING

(71) Applicant: Siemens Canada Limited, Oakville (CA)

(72) Inventors: Mirjana Zafirovic-Vukotic, Maple (CA); Joachim Lohmeyer, Hilpoltstein (DE)

(73) Assignee: Siemens Canada Limited, Ontario, CA (US)

(*) Notice: Subject to any disclaimer, the term of this patent is extended or adjusted under 35 U.S.C. 154(b) by 466 days.

(21) Appl. No.: 17/268,825

(22) PCT Filed: Sep. 27, 2018

(86) PCT No.: PCT/US2018/052999
§ 371 (c)(1),
(2) Date: Feb. 16, 2021

(87) PCT Pub. No.: WO2020/068078
PCT Pub. Date: Apr. 2, 2020

(65) Prior Publication Data
US 2021/0175722 A1    Jun. 10, 2021

(51) Int. Cl.
*H02J 3/38* (2006.01)
*H02J 13/00* (2006.01)
(Continued)

(52) U.S. Cl.
CPC ........ *H02J 3/381* (2013.01); *H02J 13/00016* (2020.01); *H02J 13/00028* (2020.01);
(Continued)

(58) Field of Classification Search
CPC ............... H02J 3/381; H02J 13/00016; H02J 13/00028; H02J 13/00034; H02J 2300/20;
(Continued)

(56) References Cited

U.S. PATENT DOCUMENTS

2002/0031142 A1   3/2002   Metin et al.
2005/0288031 A1   12/2005  Davis et al.
(Continued)

FOREIGN PATENT DOCUMENTS

EP   2688251   1/2014
EP   2916941   9/2015
(Continued)

OTHER PUBLICATIONS

PCT Search Report dated May 31, 2019, for PCT Application No. PCT/US2018/052999, 15 pages.
(Continued)

*Primary Examiner* — Mohammad Ali
*Assistant Examiner* — Dhruvkumar Patel

(57) ABSTRACT

An electrical distribution system includes a plurality of electrical substations. Each of the electrical substations includes a plurality of intelligent electronic devices (IEDs), and a communications network interconnecting the plurality of IEDs at that substation. The communications networks at the plurality of substations are configured as at least one virtual network spanning multiple ones of the plurality of electrical substations, and interconnecting at least some of the IEDs within the multiple ones of the plurality of electrical substations, and so that delays experience by messages on the at least one virtual network are below a defined threshold. The virtual networks may be reconfigured when/if the threshold is not met.

17 Claims, 5 Drawing Sheets

(51) Int. Cl.
H04L 43/0852 (2022.01)
H04L 67/12 (2022.01)

(52) U.S. Cl.
CPC .... H02J 13/00034 (2020.01); H04L 43/0852 (2013.01); H04L 67/12 (2013.01); *H02J 2300/20* (2020.01)

(58) Field of Classification Search
CPC ..... H04L 43/0852; H04L 67/12; Y02E 40/70; Y02E 60/00; Y04S 10/123; Y04S 40/124
See application file for complete search history.

(56) References Cited

U.S. PATENT DOCUMENTS

| | | | |
|---|---|---|---|
| 2010/0040068 A1* | 2/2010 | Wimmer | H04L 41/08 370/395.53 |
| 2011/0188159 A1* | 8/2011 | Su | H02H 7/261 361/38 |
| 2012/0249286 A1* | 10/2012 | Bush | H04L 63/1416 340/3.43 |
| 2013/0091180 A1 | 4/2013 | Vicat-Blanc-Primet et al. | |
| 2014/0269736 A1* | 9/2014 | Kasztenny | H04B 3/54 370/400 |
| 2014/0280712 A1* | 9/2014 | Dolezilek | H04L 1/189 709/217 |
| 2014/0280713 A1 | 9/2014 | Dolezilek et al. | |
| 2014/0280714 A1* | 9/2014 | Dolezilek | H04L 69/18 709/217 |
| 2014/0371941 A1* | 12/2014 | Keller | H02J 13/00006 700/297 |
| 2016/0373274 A1* | 12/2016 | Sivanthi | H04L 12/4633 |
| 2017/0279552 A1* | 9/2017 | Heine | H04L 43/0876 |
| 2018/0026876 A1 | 1/2018 | Steindl | |
| 2018/0254994 A1* | 9/2018 | Dolezilek | H02H 1/0061 |

FOREIGN PATENT DOCUMENTS

| | | | | |
|---|---|---|---|---|
| KR | 20160109216 A | * | 9/2016 | |
| RU | 2389117 | | 9/2015 | |
| WO | WO-2012163757 A1 | * | 12/2012 | ............. H04L 41/06 |

OTHER PUBLICATIONS

Russian Examination Report dated Dec. 16, 2021, for RU Application 2021107898/07, 34 pages.

* cited by examiner

POWER DISTRIBUTION VIRTUAL NETWORKING

TECHNICAL FIELD

This relates to power distribution networks, and more particularly to virtual networking in power substations.

BACKGROUND

In recent years, components used in electric power distribution and transmission systems have become increasingly computerized, facilitating the configuration, control and automation of such systems. Many conventional power transmission and distribution components—circuit breakers, transformers, inverters—and the like now incorporate microprocessors under software controls.

Microprocessor based devices are now typically found in power distribution substations, or otherwise deployed on the power distribution grid (e.g. on power distribution poles). These allow for the intelligent and often automated monitoring and control of power distribution subsystems and ultimately the electric power grid.

Not surprisingly, numerous protocols allowing for the intercommunication of microprocessor based power components have evolved. Notably the, IEC61850 standard for substation automation, the contents of which are hereby incorporated by reference, has been developed, and defines communications protocols, and data models allowing for standardized interoperable communication between microprocessor based devices—referred to as intelligent electronic devices (IEDs).

With the advent of distributed energy resources like photovoltaic, wind power generation, and with the proliferation of electric power storage devices, the number of IEDs in the grid is increasing and the need for communication between IEDs is also increasing.

Computer networking, however, has also separately evolved. With the advent of packet switched networks, many networking protocols and standards have been developed and refined, allowing the more flexible and sophisticated configuration and control of computer networks and the more efficient exchange of traffic on such networks. For example, the time sensitive networking (TSN) and deterministic networking (DetNet) projects have proposed additional payload (i.e. data) handling ability (e.g. data shaping, time synchronization) and controllability (e.g. stream reservation classes, registration, managed objects) as building blocks to conventional computer networks.

Most notably, virtualization in communication networks abstracts the network from the underlying hardware and enables virtual networks in diverse forms built upon fixed, installed hardware, so that hardware does not need to be replaced if network needs change.

Unfortunately, some of the approaches to computer networking are not directly compatible with, or accounted for, in substation automation.

Accordingly, there remains a need to enhance approaches to networking in power distribution automation.

SUMMARY

According to an aspect, there is provided an electrical distribution system comprising: a plurality of electrical substations, each of the electrical substations comprising a plurality of intelligent electronic devices (IEDs), and a communications network interconnecting the plurality of IEDs at that substation; wherein the communications networks at the plurality of substations are configured as at least one virtual network spanning multiple ones of the plurality of electrical substations, and interconnecting at least some of the IEDs within the multiple ones of the plurality of electrical substations, and so that delays experience by messages on the at least one virtual network are below a defined threshold.

According to another aspect, there is provided a method of configuring an electric power distribution system comprising a plurality of substations, the method comprising: interconnecting a plurality of intelligent electronic devices (IEDs) at each of the substations to a local area network; interconnecting the local area networks across at least one wide area network; configuring a plurality of virtual networks using the local area networks at the substations and the at least one wide area network; establishing a message transfer delay threshold defining a minimum acceptable delay for messages exchanged between IEDs over a virtual network; measuring delays in messages exchanged between IEDs over the virtual networks; and reconfiguring the plurality of virtual networks, to meet the message transfer delay threshold.

Other features will become apparent from the drawings in conjunction with the following description.

BRIEF DESCRIPTION OF THE DRAWINGS

In the figures which illustrate example embodiments.

DETAILED DESCRIPTION

Figure 1:
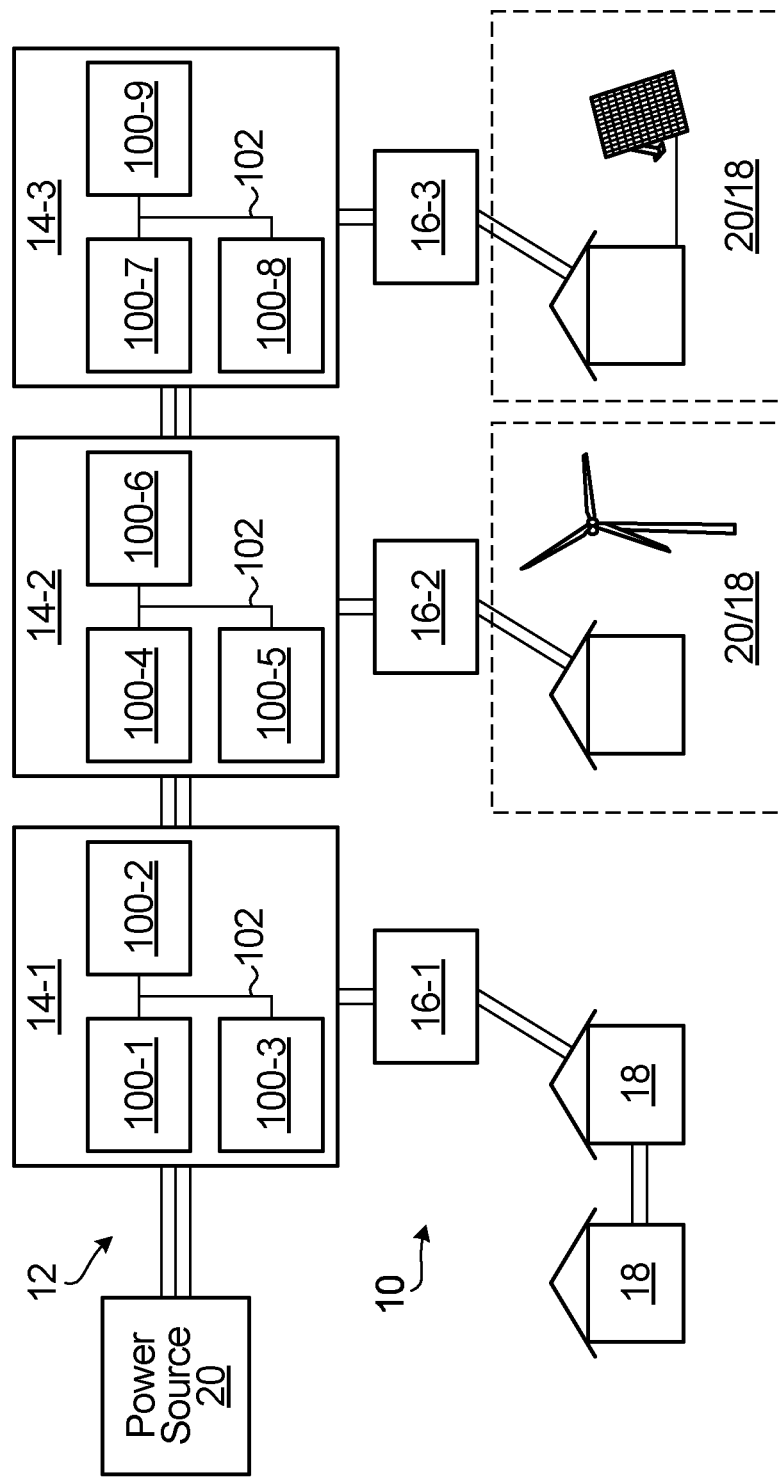
FIG. 1 is a schematic diagram of a power distribution network, exemplary of an embodiment.

FIG. 1 illustrates an exemplary power distribution network 10. Power distribution network 10 includes a high voltage distribution grid 12, providing electrical power between multiple sources and sinks. A source 20 may be a combination of hydro-electric power generation plants; nuclear power generation plants; coal generation power plants; and other power generation plants (all not specifically illustrated) that feeds power to grid 12. A source 20 may also be a photovoltaic, wind or similar source located at the premises of a customer.

Electrical power from distribution grid 12 is provided to distribution substations 14-1, 14-2, 14-3 . . . (individually or collectively distribution substation(s) 14).

Typical energy sinks 18—in the form of customer homes and factories, or the like are also depicted.

As will be appreciated, some sinks 18 may act as an energy source, and vice-versa. For example, energy consumers may also operate power generation facilities, in the form of wind, hydro or photovoltaic generation stations. These may be connected downstream of substations 14, and may also deliver electric power to the grid. Example combined sinks/source are labelled sink/source 20/18.

Distribution substations 14 provide electric power to distribution transformers 16-1, 16-2, 16-3 . . . (individually or collectively transformer(s) 16) that, in turn, transmit electrical power between sources 20 and sinks 18.

Each substation 14 includes one or more intelligent electronic devices (IEDs) 100-1, 100-2, . . . (individually and collectively IED(s) 100). As will be understood, IEDs 100 are micro-processor based controllers of power systems, and may control circuit breakers, transformers, capacitor banks, protective relays and the like.

Figure 2:
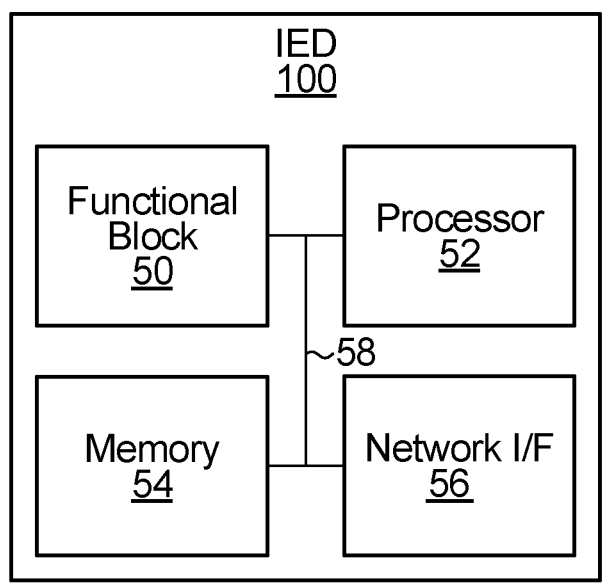
FIG. 2 is a block diagram of an intelligent electronic device.

A typical IED 100 is illustrated in FIG. 2. Typical IEDs 100 include a functional block 50 allowing the IED to act as the power electronic device, a processor 52, a network interface 56, and memory 54 interconnected over by one or more suitable buses 58. Memory 54 stores processor executable instructions adapting the IED 100 to perform in accordance with the instructions—which will of course, depend on the nature of IED 100.

For example, IEDs 100 under processor control receive data from electronic sensors and other power equipment at substation 14, (as depicted in FIG. 1) and can issue control commands, such as tripping of circuit breakers. Typically, control commands can be transmitted to other devices (including other IEDs 100) local to a substation 14, or in another substation, that may in turn react to the commands. In this way overall operation of each substation, or multiple substations may be automated.

As will be appreciated, with an increase in the number of sinks/sources on network 10, the need for intercommunicating IEDs has increased. IEDs 100 may, for example, connect and disconnect individual power sinks 20 and sources 18 to grid 12. They may likewise control the power factor of power provided to each sink 20 and from each source 18. IEDs 100 thus control or influence overall flow of electric power on grid 12.

To facilitate interoperability, example IEDs 100 may support the IEC61850 standard for substation automation, the contents of which are hereby incorporated by reference. IEC 61850 allows for standardized communication protocols that allow the intercommunication between IEDs 100.

In accordance with IEC 61850, IEDs 100 may communicate using one or more communications protocols including the manufacturing message specification (MMS); generic object oriented substation event (GOOSE); and sampled measured value (SMV) protocols. IEDs 100 accordingly support one or more of such communications protocols.

As will be appreciated, existing IEC 61850 protocols may be transported using network interfaces at IEDs 100, in high speed switched Ethernet frames, or even over internet protocol (IP) provided that the response time allows for fast (e.g. sub 4 ms) response of IEDs 100 to control messages. In this way, one IED 100 at a substation 14 (FIG. 1) may provide control signals to other IEDs 100 at that substation. Real time (or near real time) automated control of substations 14 may thus be achieved. This, in turn, may allow for overall control of the power grid 12.

Figure 3:
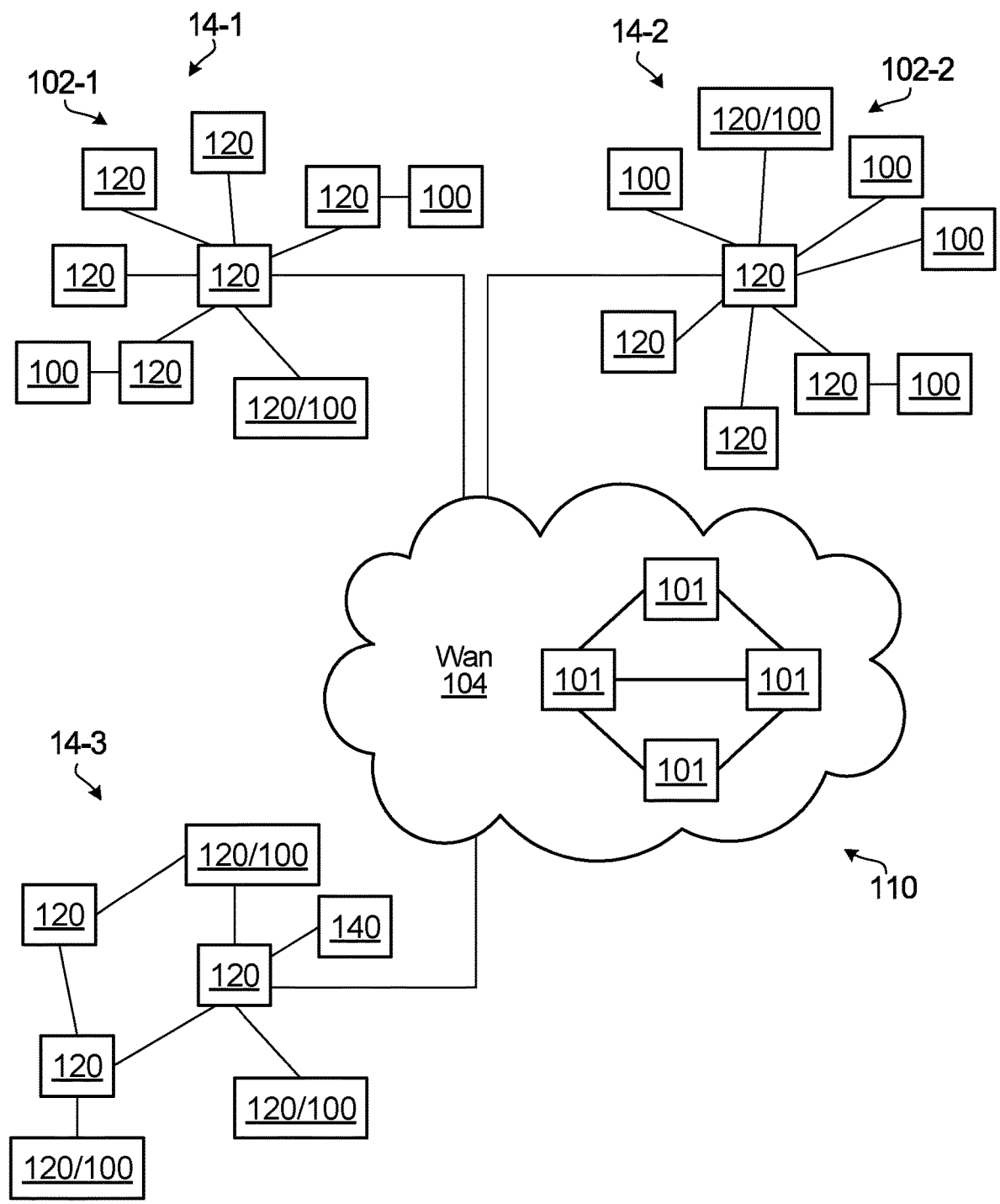
FIG. 3 is a schematic block diagram of local area networks and virtual networks in the power distribution of FIG. 1.

Each substation 14 thus further includes one or more physical nodes 120 that interconnect IEDs 100 local to that substation 14. Physical nodes 120 are organized to form one or more local area networks (LANs) 102 or other computer communications networks. LANs 102 are schematically illustrated in FIG. 3. IEDs 100 may act as nodes on LAN 102, and may be integrated with other nodes on network. The physical nodes are organized to form one or more local area networks (LANs) 102 or other networks.

IEDs 100 at substation 14-1 are directly attached to a LAN 102-1. IEDs 100 at substation 14-2 are connected to LAN 102-2, and so on with IEDs 100 at the $n^{th}$ substation 14-$n$ connected to LAN 102-$n$. For ease of understanding, only three substations and LANs are depicted. LANs 102-1, 102-2, . . . are individually and collectively referred to as LAN(s) 102. LANs 102 may, for example, be a time sensitive network (TSN) enhanced Ethernet as detailed in the IEEE TSN standards (including base standards for TSN: IEEE Std 802.1Q-2018: Bridges and Bridged Networks; IEEE Std 802.1AB-2016: Station and Media Access Control Connectivity Discovery (specifies the Link Layer Discovery Protocol (LLDP)); IEEE Std 802.1AS-2011: Timing and Synchronization for Time-Sensitive Applications in Bridged Local Area Networks; IEEE Std 802.1AX-2014: Link Aggregation; IEEE Std 802.1BA-2011: Audio Video Bridging (AVB) Systems; IEEE Std 802.1CB-2017: Frame Replication and Elimination for Reliability; IEEE Std 802.1CM-2018: Time-Sensitive Networking for Fronthaul, the contents of all of which are hereby incorporated by reference) or Ethernet as per IEEE 802.1Q, or any other suitable LAN.

Multiple LANs 102 are interconnected by way one or more wide area network (WAN) 104 and form communication network 110 that spans the multiple substations 14. WAN 104 may, for example, be the public Internet, a deterministic network (DetNet) enhanced internet, or any other suitable wide area network, and may include multiple physical network nodes 101.

Each physical network node 120 of LAN 102 and network nodes 101 of WAN 104 may take the form of a packet switch, router, computing device, or other conventional network node, known to those of ordinary skill. As such, each physical network node 120/101 is typically addressable on network 110 by its own network address, and includes its own networking logic. For example, a network switch may include a network switch fabric, including ports and control logic.

As noted, IEDs 100 may be nodes 120 on LANs 102, and may be included in other nodes 120. In example embodiments, at least some of network nodes 120 are dynamically reconfigurable. Such configurability, allows network routing and data transport functions of nodes 120 to be reconfigured. Example network nodes 120 may, for example, be TSN and DetNet compliant nodes.

In some embodiments, network nodes 120 are software defined network (SDN) nodes under centralized control, by for example an SDN controller, like network controller 140. As will be appreciated, SDN refers software based network configuration and physical or virtual nodes compliant therewith, by way of controller platforms like OpenDaylight, protocols like OpenFlow and other, like those currently standardized by the Open Networking Foundation. Example network nodes 120 may, for example, be TSN and DetNet compliant nodes that are also SDN nodes under the centralized control of network controller 140.

In other embodiments, network nodes 120 may be under distributed operation control, for example by way of the intermediate system to intermediate system (IS-IS) protocol. Each approach allows for the remote and/or dynamic configuration of routing/forwarding tables used at each of network nodes 120 to switch or route traffic to adjacent nodes.

One or more network controllers 140 may be in communication with nodes 120. A network controller 140 for a LAN (e.g. LAN 102-1) may be local to the substation 14-1 for that LAN 102-1, or may be located at another substation.

As such, there may be fewer network controllers 140 than LANs 102. Alternatively, in the presence of redundancy, there may be more such controllers 140 with one controller 140 capable of operating in place of another, in case of failure or unavailability.

A network controller 140 for a WAN 104 may be located in WAN 104 or elsewhere—for example in a substation 14. The domain of a network controller 140 may be a physical network like a LAN 102, or WAN 104 or a virtual network, built upon physical network nodes or built upon another virtual network, as detailed below.

Network controllers 140 may include software and hardware to allow networking functions of nodes 120 and 101 to be configured, by an administrator or in an automated fashion by a network administrator. To that end, network controller 140 may include software that supports a suitable network configuration/management protocol that is understood by nodes 120 and 101, and allows for reconfiguration of network functions at nodes 120 and 101. Suitable network configuration protocols include OpenFlow, Border Gateway Protocol (BGP) plugins for OpenDaylight, Open Shortest Path First (OSPF) plugins for OpenDaylight, Network configuration protocol (NETCONF) protocols. Network controllers 140 (and nodes 120 and 101) may, for example, be controllers/nodes compatible with the SDN architecture.

Figure 4:
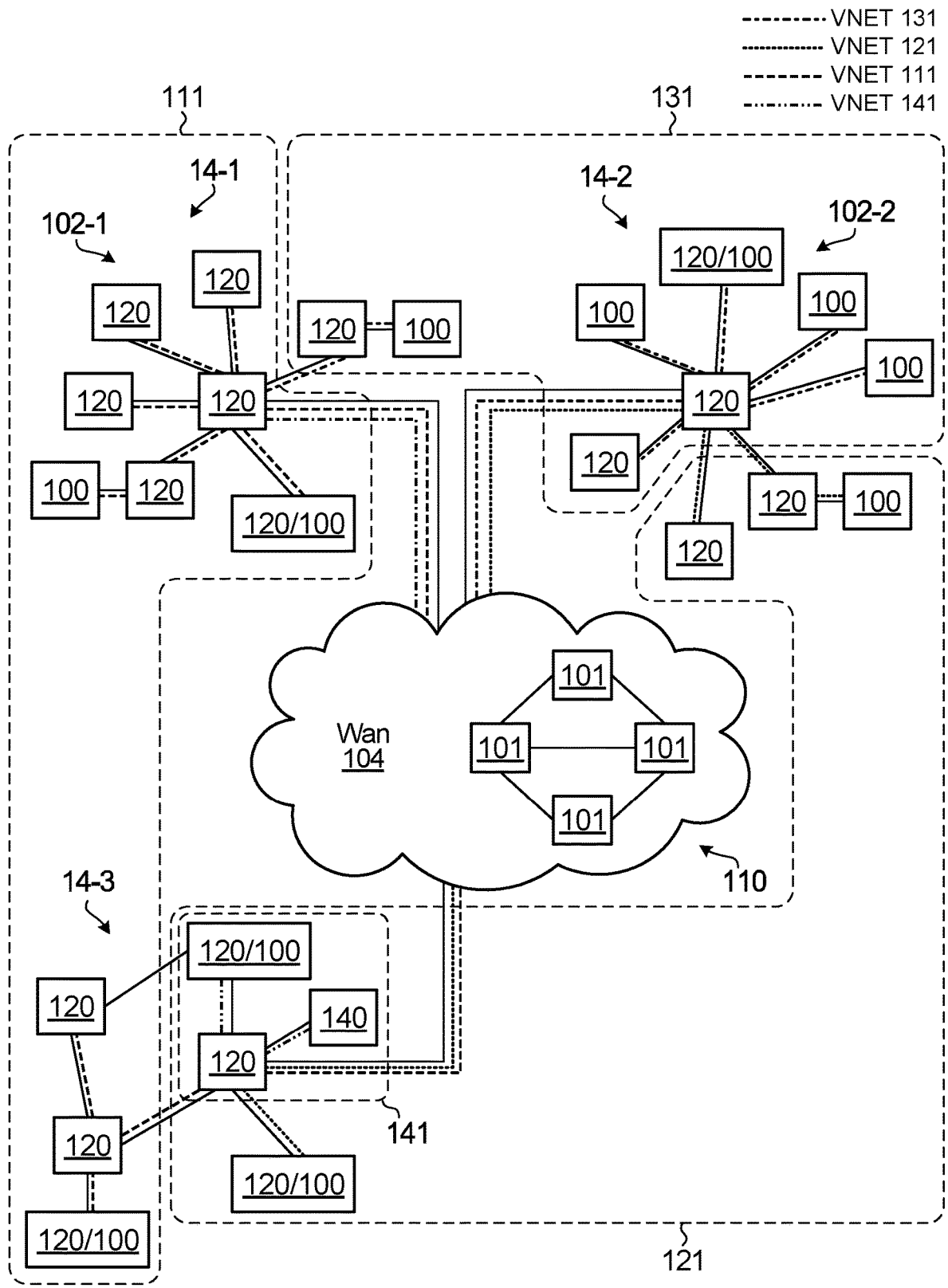
FIG. 4 is a simplified diagram of networks in the power distribution of FIG. 1.

Exemplary of embodiments, a plurality of virtual networks are established on LANs 102 and WAN 104. Example virtual networks 111 (VNET 111), virtual network 121 (VNET 121), virtual network 131 (VNET 131) and virtual network 141 (VNET 141), established on networks 102, WAN 104 and thus network 110 are depicted in FIG. 4. Links between nodes 101 on WAN 104 are not depicted.

Virtual links on physical links between nodes 120 are depicted. As will be appreciated each physical link may carry multiple virtual links, and each physical node 120 may act as virtual node in one or more virtual networks.

Moreover, virtual networks may span across multiple LANs 102 and WAN 104, and thus across network 110. In the example embodiment, each LAN 102 may be divided into several virtual networks. Additionally, a virtual network 111, 121 and 131 may span multiple LANs 102 and WAN 104.

As noted, virtual networks are built upon physical nodes 120 and 101. Moreover, virtual networks may be established on other virtual networks.

Put another way, virtual networks may be layered, one over another, and each physical node 120 or 101 may form part of one or more virtual networks. In turn each virtual network includes virtual nodes that are founded on physical nodes 120. A virtual network usually contains a smaller number of virtual nodes than the number of physical nodes on network 110. Further any virtual network build upon an established virtual network includes its own virtual network nodes that are based on the virtual (and thus physical nodes) of the underlying virtual and physical networks. For example, in FIG. 4, virtual network 141 is established on virtual network 121.

The configuration of nodes 120 of each LAN 102 to establish the virtual networks may, for example, be controlled by network controllers 140, under for example, control of software executing at network controllers 140. Network virtualization may be established by configuring physical nodes 120 using known protocols, or extensions of such protocols. For example, each of nodes 120 involved in traffic redistribution may be compatible with a suitable network virtualization protocol or standard. Example network protocols that enable virtualization include multiprotocol label switching (MPLS), OpenFlow, BGP plugins for OpenDaylight, OSPF plugins for OpenDaylight, NETCONF, IEEE 802.1Q Edge Control protocol, the Multiple VLAN Registration Protocol, Internet Protocol Security (IPsec), or IS-IS.

Firewalls 202 may further form part of communications network 110, and may be found at one or more of substations 14, physically interconnected to the respective LAN(s) 102 at those substations. Optionally, multiple firewalls 202 may be provided for redundancy. A firewall 202 may operate as a firewall for one or more of virtual networks 111, 121, 131, 141. Each firewall 202 includes a software function, possibly assisted by hardware, and such function is created, maintained and destroyed based on hardware resources availability in substation networks and WAN 104. The location of firewall 202 may be established dynamically based on available resources in communications network 110, and may thus migrate. Firewalls 202 may intercept traffic destined for an associated virtual network 111, 121, 131, 141 to ensure only authorized traffic arrives on the virtual network. GOOSE messages from and to a virtual network 111, 121, 131, 141 may, for example, be transferred through firewall(s) 202. OpenFlow and similar protocols maybe used to configure and migrate firewalls. Again, configuration may be initiated by controllers 140 under software control.

IEDs 100 communicate using GOOSE messages using services of one or more of VNETs 111, 121 to communicate with other IEDs 100 on those VNETs or other VNETs (e.g. VNET 131). VNETs 111, 121, 131, 141 provide communication services for these GOOSE messages and for other messages and applications. A VNET 121 provides communication services by using services of one or more underlying VNETs 141, and each such VNET 141 in turn may use services of other underlying VNETs (not shown) until physical nodes 120 are used.

For example, there are TSN enhanced physical networks as LANs and DetNet enhanced as one or more physical WANs. Further, a network controller 140 under software control, using OpenFlow protocols may configure a virtual network 121 connecting certain IEDs. Such network is isolated from other virtual networks (e.g. VNET 131) and other traffic on the physical and virtual network. The resulting virtual network 121 may be for GOOSE and for MMS traffic, with specific GOOSE type messages having the strictest real-time requirements and the service. Further, the DetNet may have another virtual network configured on top of it. On top of these virtual networks there may be one or more virtual networks carrying virtual local area network (VLAN) labeled GOOSE messages with one VLAN identifier i.e. VLAN label for each GOOSE type.

Now, to be effective GOOSE messages must comply with end-to-end delays maxima for which GOOSE messages are used. Applications that communicate using GOOSE messages may be classified as the strictest real-time applications. In an example embodiments, depending on the type of GOOSE message, and other parameters, the end-to-end delay maxima may be different than for other applications and this may be accomplished by one or more QoS classes, normally by assigning GOOSE messages with the strictest delay requirements (i.e. to be the strictest real-time application) corresponding to the QoS class that provides the strictest delay on the network. IEDs 100 may host a few such strictest real-time applications using GOOSE messages.

For example, applications residing at an IED 100, that communicates with other IEDs 100 using GOOSE messages, may carry an electric circuit trip command or other data that needs to be transported between IEDs 100 within defined thresholds—for example threshold A and threshold B for end-to-end delays of the strictest real-time application for which GOOSE messages are used, where threshold A is a desired delay and threshold B is a maximum tolerable delay. Both threshold A and threshold B may be represented as vectors with a multiple parameters that include: latency [measured in time units], frequency, time interval for frequency [measured in time units], and other optional parameters. Such end-to-end delay thresholds for IEDs 100 are used to determine the thresholds of the same kind for each VNET 111, 121, 131, 141. Information exchange and any negotiations in this regard (i.e. to establish VNET thresholds for each VNET) may happen between network controllers 140 using OpenFlow or other suitable protocol. So, we have the desirable delay threshold i.e. threshold A for each VNET (e.g. VNET 111), and the maximum tolerable delay threshold i.e. threshold B for each VNET (e.g. VNET 111), both threshold A and threshold B for the strictest real-time application for which GOOSE messages are used.

Frequency denotes the number of occurrence of delay being larger than the latency in the time interval for frequency divided by all occurrences of the delay. Threshold A and threshold B can be communicated e.g. using OpenFlow, Hypertext Transfer Protocol Secure (HTTPS), NETCONF, or other suitable protocols. by an IED 100 to the network 110, e.g. to the network controller 140, or network 110 e.g. network controller 140 can calculate them based on other data communicated by the IED 100 or communicated by entity controlling IEDs (not shown) e.g. using HTTPS, NETCONF, IEC 61850, or other suitable protocol.

Different applications or functions at each IED 100 may also need different qualities of service.

Figure 5:
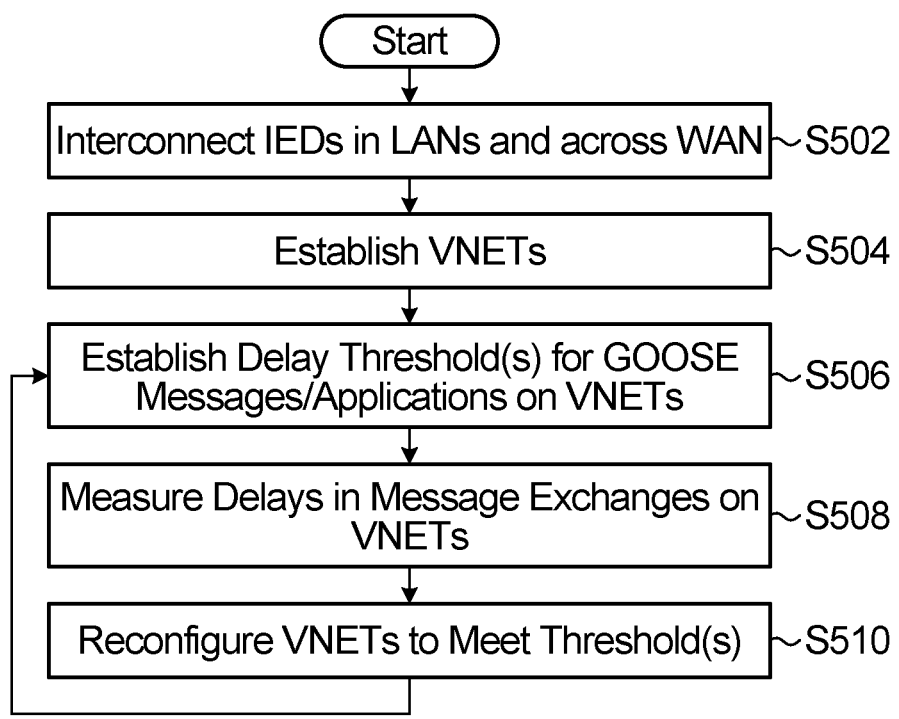
FIG. 5 is a flow chart illustrating the establishment and (re)configuration of virtual networks in the power distribution network of FIG. 1

In accordance with example embodiments, as illustrated in FIG. 5, IEDs 100 are interconnected in LANs 102 and across WAN 104 in block S502. Virtual networks may be established as described above, in block S504. Suitable message delay thresholds defining a minimum acceptable delay for messages exchanged between IEDs 100 and over each virtual network (e.g. VNET 111, 121, 131, 141) may be established in block S506. These thresholds may be protocol and VNET specific. Delays in messages exchanged between IEDs over the virtual networks may be measured in block S508.

If VNET or IEDs end-to-end thresholds are not met, VNETs 111, 121, 131, 141 may be reconfigured in block S510 to meet the message transfer delay threshold. For example, the VNETs may be reconfigured to meet both threshold A and threshold B for the strictest real-time application for which GOOSE messages are used. The reconfiguration may be done using OpenFlow, NETCONF, IS-IS, or other suitable protocol.

Specifically, the established thresholds B may be used to monitor the network and to trigger reconfiguration/recalculation of VNETs 111, 121, 131, 141. To that end, controllers 140, under software control may measure and monitor network delays on VNETs 111, 121,131 and 141 to ensure that internode communication on each of VNETs 111, 121, 131 and 141 meets threshold B. For example, message delays between all node pairs on a VNET may be measured. If threshold B is not met between nodes on a VNET 111, 121, 131, or 141 SDN controller 140 may re-configure underlying nodes 120 of LANs 102 and 101 of WAN 104 so that thresholds are met, for example, both threshold A and threshold B for the strictest real-time application for which GOOSE messages are used.

Specifically, threshold A and threshold B for the end-to-end delays of the strictest real-time application for which GOOSE messages are used, are input in calculation of VNET 111, 121, 131, 141 using underlying nodes 120 of networks 102 and 101 of WAN 104. In one such embodiment, threshold A, which is the desired delay is the direct input to calculations e.g. to the shortest path algorithms for the corresponding VNET (and the measured delays are compared to threshold B which is a maximum tolerable delay)

Optionally, a network controller 140 of a virtual network (e.g. VNET 141) built upon another virtual network (e.g. VNET 121) may pass a message to the network controller 140 of VNET 121 to reconfigure underlying physical nodes used by both VNET 141 and VNET 121. This may lead to further information exchange and negotiations between controllers 140 of VNETs. Network controllers 140 may use OpenDaylight or another suitable platform which accommodates such communication and information exchange between network controllers. OpenFlow or another suitable protocol could be used for such communication.

VNET thresholds are determined and delays measured for a delay that a message experiences in transfer between two end points in the virtual network: e.g. two switch/router ports of nodes 120 interfacing IEDs 100. Delays may be measured directly at IEDs 102 or at virtual or physical ports of routing nodes 120.

Message delays may be measured at each IED 100, for example, by including a timestamp in an originated GOOSE message at an IED 100, dispatching the message over a VNET (e.g. VNET 111, 121, 131 or 141) and comparing this timestamp to the received time at a recipient IED. Alternatively, packets may be inspected to identify a GOOSE message and associate with it a time stamp in each point of entry and exit to a VNET. Such time stamps could be used to determine the delay.

Ultimately, receiving and/or sending IEDs 100 may observe the delays, and may notify to network controller 140 for the VNET on which the delay is observed. For example, if delay measured at any IED 100 is larger than end-to-end threshold B for the strictest real-time application, that IED 100 may originate a message to its network controller 140. These messages and the data may be communicated to the network controller 140 by the IED 100 or communicated by entity controlling IEDs (not shown) e.g. using HTTPS, NETCONF, IEC 61850, or other suitable protocol. Network controller 140 may, in turn, react by calculating a new topology, and reconfigure the VNET.

If end-to-end delays for GOOSE messages for a specific VNET 111, 121, 131, 141 as measured are larger than the threshold B for the strictest real-time application, then a new VNET topology for the applicable specific VNET may be calculated, including the new resource allocation to ensure end-to-end delays are smaller than the threshold A for each of VNET 111, 121, 131, 141. Thresholds A and B may have specific, different, values for each VNET 111, 121, 131, 141. Optionally, thresholds A and B can be changed in the presence of changing traffic properties or similar with the goal to provide end-to-end thresholds to the strictest real-time application that uses GOOSE. For example, if a VNET—for example VNET 131—encounters quality of service degradation, and new thresholds for VNET 131 are set accordingly e.g. to a somewhat larger frequency of exceeding the minimum tolerable delay in threshold B. Other VNETs 121 and VNET 111 may be configured with new thresholds with stricter delay and frequency in threshold B and possibly A.

Conveniently, software at controller 140 may set thresholds and calculate alternate topologies/routes between nodes 120 and 101 on network 110, with lower delays. OpenDaylight, IS-IS, protocols and calculations utilizing the shortest path algorithms, MPLS, and other protocols may be used to that end. Alternatively, controller 140 may initiate distributed reconfigurations of nodes 120 and 101 using a suitable protocol, such as IS-IS, using QoS constraints. As such, alternate topologies may be established using another protocol.

Each VNET 111, 121, 131, 141 may use its controller 140 to determine the routes and handles allocation of resources and passes information to nodes 120 (e.g. switches/routers) that install virtual routing/forwarding tables for VNETs 111, 121, 131, 141.

Blocks S506-S510 may be repeated periodically, or on demand to ensure that established VNETs continue to meet messaging thresholds, as network conditions change.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. An electrical distribution system comprising:
   a plurality of electrical substations, each of said electrical substations comprising a plurality of intelligent electronic devices (IEDs), and a communications network interconnecting the plurality of IEDs at that substation;
   wherein the communications networks at the plurality of substations are configured as at least one virtual network spanning multiple ones of said plurality of electrical substations, and interconnecting at least some of said IEDs within said multiple ones of said plurality of electrical substations, and so that end-to-end delays experienced by messages on said at least one virtual network are below a defined first delay threshold, and
   wherein the system determines a new topology of the at least one virtual network in response to a measured delay being greater than a second delay threshold, and the system reconfigures the at least one virtual network based on a resource allocation of the new topology to ensure that delays are less than the first delay threshold for each of the at least one virtual network.

2. The electrical distribution system of claim 1, wherein said messages comprise generic object oriented substation event (GOOSE) messages carried on one of said at least one virtual network.

3. The electrical distribution system of claim 1, comprising a firewall device that limits network access to one of said at least one virtual networks and IEDs on said virtual network, at the multiple ones of said plurality of electrical substations.

4. The electrical distribution system of claim 2, further comprising at least one network controller in communication with nodes on said plurality of communications networks operable to configure said nodes so that delays experienced by GOOSE messages on said at least one virtual network are below the defined first delay threshold.

5. The electrical distribution system of claim 4, wherein said at least one network controller reconfigures said virtual network in response to the delay exceeding the defined first delay threshold.

6. The electrical distribution system of claim 4, wherein said at least one network controller measures the delay experienced by messages transferred between IEDs on a virtual network.

7. The electrical distribution system of claim 5, wherein each of the IEDs is configured to notify said at least one network controller of message delays in excess of the defined first delay threshold.

8. The electrical distribution system of claim 7, wherein said at least one network controller is operable to configure nodes on local networks to establish said virtual networks.

9. A method of configuring an electric power distribution system comprising a plurality of substations, said method comprising:
   interconnecting a plurality of intelligent electronic devices (IEDs) at each of said substations to a local area network;
   interconnecting the local area networks across at least one wide area network;
   configuring at least one virtual network using the local area networks at the substations and the at least one wide area network;
   establishing a first message transfer delay thresholds defining a minimum acceptable end-to-end delay for messages exchanged between IEDs over a virtual network;
   measuring a delay over the at least one virtual network in a message exchanged between IEDs; and
   in response to the measured delay being greater than a second message delay threshold, determining a new topology for the at least one virtual network and reconfiguring the at least one virtual network based on a resource allocation of the new topology to meet the first message transfer delay threshold.

10. The method of claim 9, further comprising establishing a second message transfer delay threshold for minimum acceptable delays for messages exchanged between IEDs and over a virtual network, and reconfiguring the at least one virtual network, to meet the first message transfer delay threshold.

11. The method of claim 9, wherein the reconfiguring is performed at a network controller in communication with the local area networks.

12. The method of claim 11, further comprising signalling from one of said IEDs to said network controller that the first message transfer delay threshold has not been met.

13. The method of claim 9, wherein the IEDs communicate using generic object oriented substation event (GOOSE) messages and measuring the delay comprises measuring delays in transmitting GOOSE message between IEDs.

14. The method of claim 9, wherein the at least one virtual network spans at least two of said local area networks.

15. The method of claim 9, further comprising computing a new virtual network topology using a measured delay in a message exchanged across the at least one virtual network.

16. The method of claim 9, wherein the reconfiguring is initiated by at least one network controller operable to configure the at least one virtual network.

17. The method of claim 16, where the delay in the message exchanged is communicated to said at least one network controller.

* * * * *